US010951672B2

(12) United States Patent
Gero et al.

(10) Patent No.: US 10,951,672 B2
(45) Date of Patent: Mar. 16, 2021

(54) MULTICAST OVERLAY NETWORK FOR DELIVERY OF REAL-TIME VIDEO

(71) Applicant: Akamai Technologies, Inc., Cambridge, MA (US)

(72) Inventors: Charles E. Gero, Quincy, MA (US); Martin Lohner, Cambridge, MA (US); Abhijit C. Mehta, Mountain View, CA (US); Brandon O. Williams, Revere, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/747,267

(22) Filed: Jan. 20, 2020

(65) Prior Publication Data

US 2020/0153882 A1 May 14, 2020

Related U.S. Application Data

(63) Continuation of application No. 15/856,652, filed on Dec. 28, 2017, now Pat. No. 10,542,057.

(60) Provisional application No. 62/440,437, filed on Dec. 30, 2016.

(51) Int. Cl.
*G06F 15/16* (2006.01)
*H04L 29/06* (2006.01)
*H04L 29/08* (2006.01)

(52) U.S. Cl.
CPC ........ *H04L 65/4076* (2013.01); *H04L 65/403* (2013.01); *H04L 65/4084* (2013.01); *H04L 67/1074* (2013.01); *H04L 65/608* (2013.01)

(58) Field of Classification Search
CPC .............. H04L 65/4076; H04L 65/403; H04L 65/4084; H04L 65/608; H04L 67/1074
USPC ........................................................ 709/231
See application file for complete search history.

(56) References Cited

U.S. PATENT DOCUMENTS

| 8,458,253 | B1* | 6/2013 | Sojka | .................. H04L 65/1063 |
| | | | | 709/204 |
| 8,638,696 | B1* | 1/2014 | Sojka | .................... H04L 65/608 |
| | | | | 370/260 |
| 8,706,473 | B2* | 4/2014 | Chou | .................. H04L 65/4084 |
| | | | | 704/2 |
| 9,112,932 | B1* | 8/2015 | Sojka | .................. H04L 65/1063 |
| 9,413,791 | B1* | 8/2016 | Sojka | .................... H04L 65/403 |

(Continued)

*Primary Examiner* — Moustafa M Meky
(74) *Attorney, Agent, or Firm* — David H. Judson

(57) ABSTRACT

A method of multicasting real-time video is described. The method begins by establishing a multicast network of machines capable of ingress, forwarding and broadcasting traffic, together with a mapping infrastructure. The multicast network preferably comprises a portion of an overlay network, such as a content delivery network (CDN). A video stream is published to the multicast network by (a) using the mapping infrastructure to find an ingress node in the multicast network, and then receiving the video stream from a publisher at the ingress node. One or more subscribers then subscribe to the video stream. In particular, and for subscriber, this subscription is carried out by (a) using the mapping infrastructure to find an egress node for the requesting client, and then delivering the video stream to the subscriber from the egress node. Preferably, the publisher and each subscriber use WebRTC to publish or consume the video stream, and video stream is consumed in a videoconference.

15 Claims, 5 Drawing Sheets

(56) References Cited

U.S. PATENT DOCUMENTS

| | | | |
|---|---|---|---|
| 9,674,232 B1* | 6/2017 | Sojka | H04L 65/1006 |
| 10,033,657 B2* | 7/2018 | Barth | H04L 43/16 |
| 10,581,752 B2* | 3/2020 | Barth | H04L 47/20 |
| 2011/0267988 A1* | 11/2011 | Simard | H04M 3/561 |
| | | | 370/260 |
| 2013/0066623 A1* | 3/2013 | Chou | H04L 67/2823 |
| | | | 704/2 |

* cited by examiner

MULTICAST OVERLAY NETWORK FOR DELIVERY OF REAL-TIME VIDEO

BACKGROUND

Technical Field

This application relates generally to videoconferencing utilizing a browser.

Brief Description of the Related Art

Real-time communications (e.g., videoconferencing, shared document editing, screen sharing, and the like) over the Internet have been a part of our daily lives at work and at home. That said, many of the existing technical solutions are not interoperable, and there are still difficult technical problems (e.g., NAT traversal) that can stymie direct peer-to-peer connections, thus dictating the use of relays to ensure connectivity. When relays are overloaded, call quality suffers. Further, multi-party video conferencing typically requires a separate connection for each pair of users, and this approach does not scale.

WebRTC, an Internet standard, was created to make videoconferencing and point-to-point data transfer easier to implement. In particular, WebRTC (which stands for Web Real Time Communications) seeks to take the most critical elements of video chat and move them to one of the most commonly used tools for accessing the Internet, namely, a web browser. WebRTC is supported with plugins by both Google Chrome and Mozilla Firefox. It allows the browser to access the client machine's camera and microphone, provides a method for establishing a direct connection between two users' browser and to use that connection to send audio and video, and it provides a method for sending arbitrary data streams across a connection. WebRTC further mandates that all data is encrypted. While WebRTC provides significant advantages, it does not itself address the scaling challenges associated with connectivity across NAT and multi-party conferencing.

While WebRTC provides significant advantages, it does not itself address the scaling challenges associated with connectivity across NAT and multi-party conferencing. Thus, for example, a relay infrastructure (using TURN) is needed to establish connections between two peers behind NATs, and building a robust and scalable relay infrastructure is challenging. Additionally, multi-user video conferencing over WebRTC requires full mesh connectivity between all users; that is, a separate connection must be established between each pair of users. Each user needs to upload their video (and other data) multiple times—once for each peer—and the resources required grow in a way proportional to the square of the number of users, which does not scale. These issues are not limited to WebRTC; indeed, existing, dedicated video conferencing solutions struggle with the same problems. For example, Microsoft's Skype relays are often overloaded, significantly impacting the quality of Skype calls that cannot use a direct peer-to-peer connection. Another common solution, LifeSize, needs the same full-mesh connectivity described above, which severely limits the number of different remote sites that can participate in one meeting.

The remains a need to enhance the performance, reliability and scalability of WebRTC and to provide a ubiquitous platform for real-time collaboration.

BRIEF SUMMARY

This disclosure provides for multicasting real-time video to multiple subscribers using an overlay network on top of the Internet. The technique assumes that the overlay network provides a network of machines capable of ingress, forwarding, and broadcasting traffic, together with a mapping infrastructure that keeps track of the load, connectivity, location, etc., of each machine and can hand this information back to clients using DNS or HTTPS. These machines provide for an application layer-over-IP routing solution (or "OIP routing"). The approach implements multicast OIP to distribute individuals' video streams in a multiparty videoconference.

According to one aspect, a method of multicasting real-time video is described. The method begins by establishing a multicast network of machines capable of ingress, forwarding and broadcasting traffic, together with a mapping infrastructure. The multicast network preferably comprises a portion of an overlay network, such as a content delivery network (CDN). A video stream is published to the multicast network by using the mapping infrastructure to find an ingress node in the multicast network, and then receiving the video stream from a publisher at the ingress node. One or more subscribers then subscribe to the video stream. In particular, and for the subscriber, this subscription is carried out by using the mapping infrastructure to find an egress node for the requesting client, and then delivering the video stream to the subscriber from the egress node. Preferably, the publisher and each subscriber use WebRTC to publish or consume the video stream, and video stream is consumed in a videoconference.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
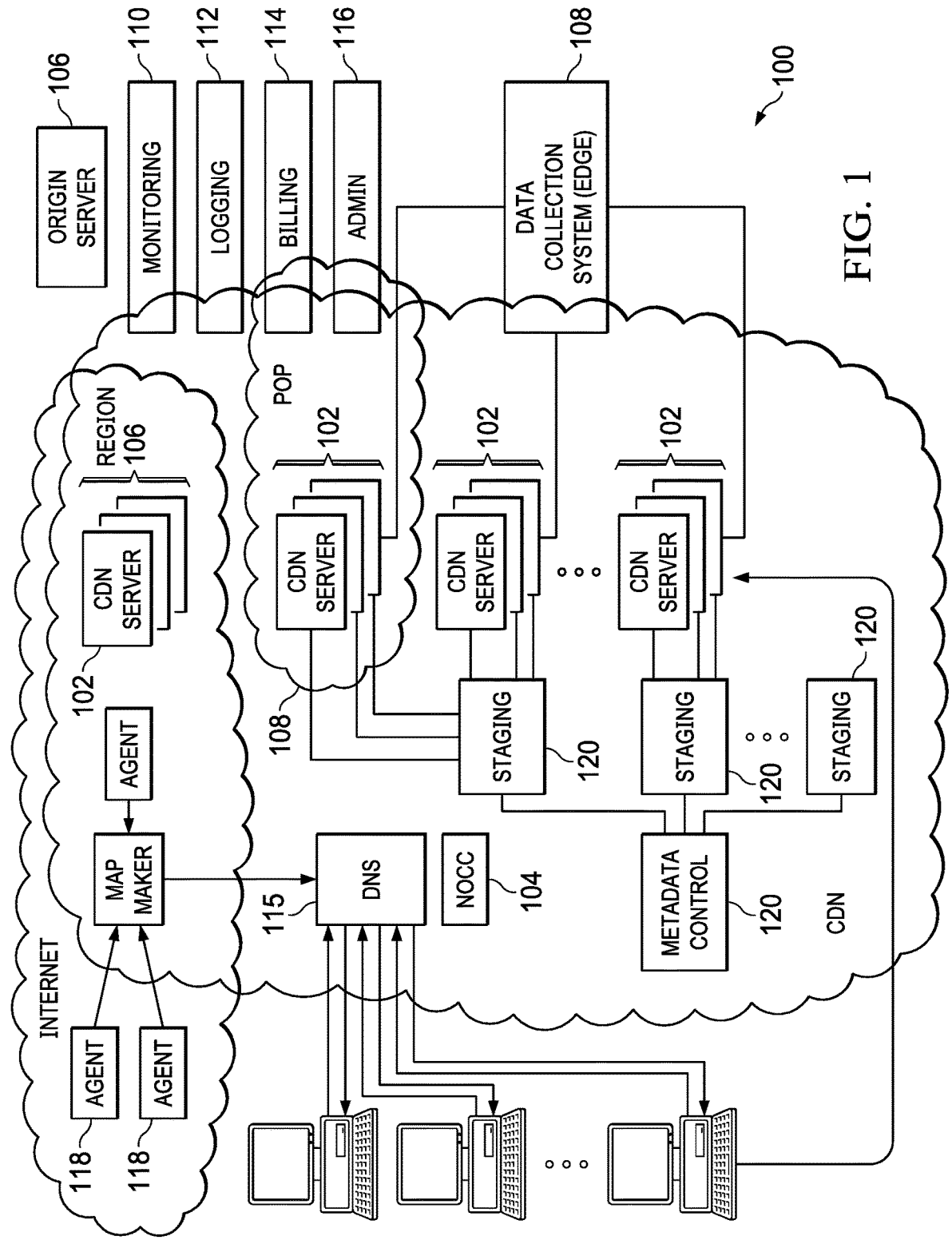
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
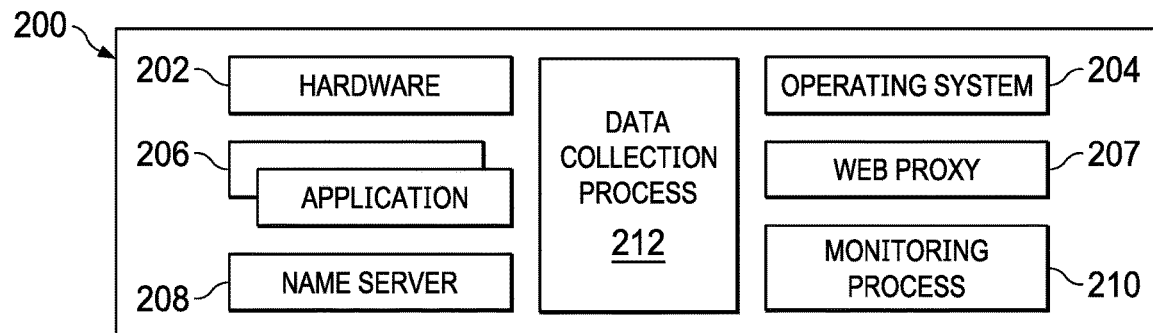
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Figure 3:
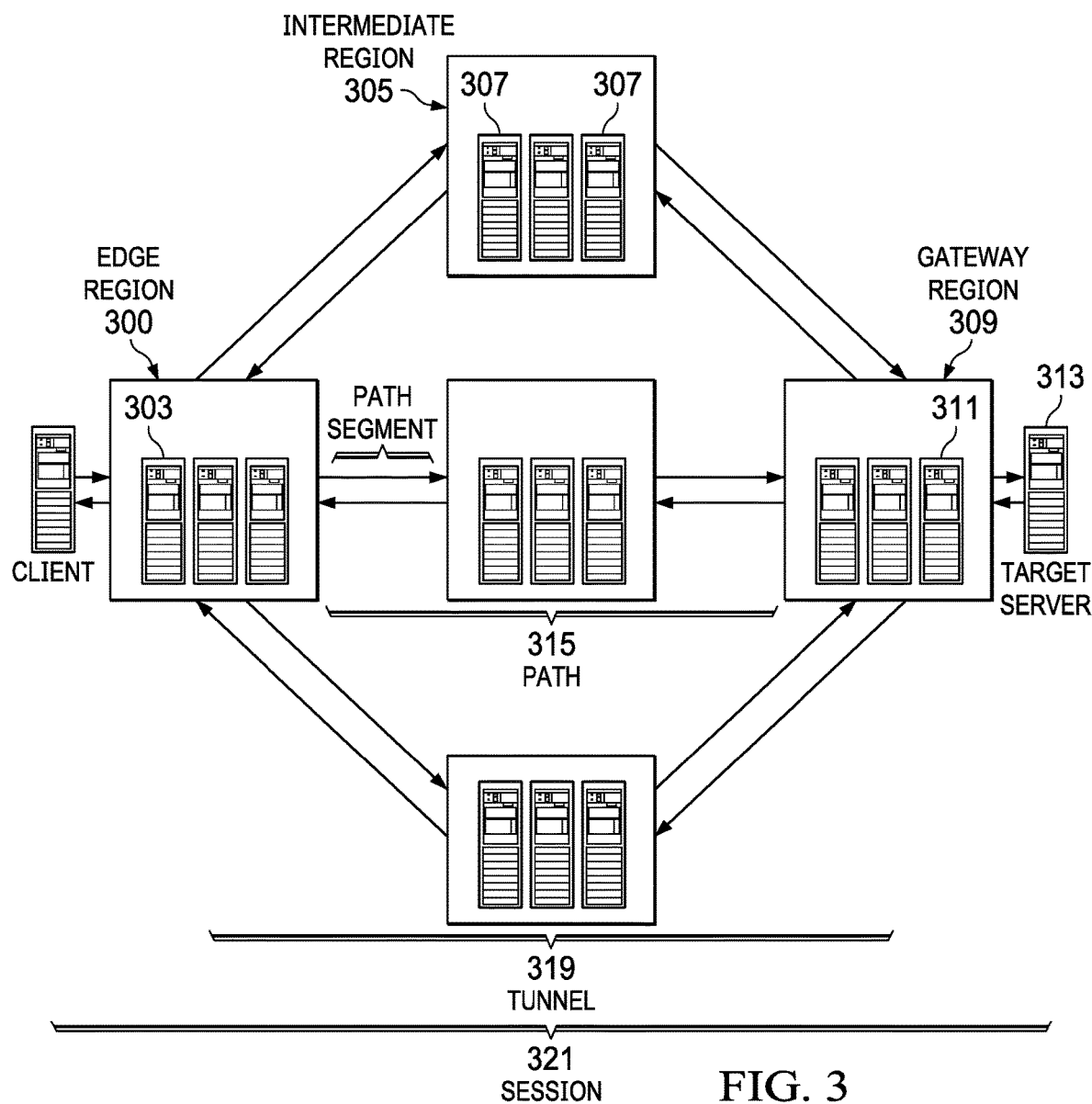
FIG. 3 is a known overlay solution whereby an overlay is positioned on top of the publicly-routable Internet.

FIG. 3 illustrates a known "overlay" network solution whereby an "overlay" is positioned on top of the publicly-routable Internet. This architecture is sometimes referred to as a "routing overlay" or "routing overlay network." The routing overlay network may leverage existing content delivery network (CDN) infrastructure, such as the infrastructure shown in FIGS. 1-2 above, and as provided by commercial services providers such as Akamai Technologies, Inc. of Cambridge, Mass. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes the packet's destination, which Internet routers use to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

Many of the machines in the overlay are servers located near the edge of the Internet, i.e., at or adjacent end user access networks. As has been described above, e.g., FIG. 1, third party web sites and application providers offload delivery of content and applications to the network, which operates as a managed service. The overlay network includes distributed infrastructure for data collection, monitoring, logging, alerts, billing, management and other operational and administrative functions. As has been described and as shown in FIG. 2, a typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP routing mechanism comprises a representative set of components, as illustrated in FIG. 3:

- edge server 303—typically, a CDN edge server running an OIP edge server software process (oidp) as described below. As will be described, this software is responsible for receiving, encapsulating and forwarding IP packets.
- edge region 301—typically, a CDN edge region configured for the overlay mechanism.
- intermediate server 307—typically, a server that receives encapsulated packets from an edge region or other intermediate servers and forwards them on to other intermediate servers or to a gateway region.
- intermediate region 305—a region of intermediate servers.
- gateway server 311—typically, an edge server that has been configured to receive encapsulated packets from the overlay, and that applies source network address translation (NAT) to the original packets and forwards them onto the target server.
- gateway region 309—typically, a type of edge region comprising gateway servers and that is usually deployed on customer premises.
- Target server 3132—a machine whose traffic is to be tunneled through the overlay.
- target address—the IP address of the target server; this address is sometimes referred to as a direct address when being compared to a CDN virtual IP address.
- slot—a single "instance" of the overlay; preferably, a slot is a numbered index that corresponds to a single target address.
- virtual IP address—typically, a CDN address that corresponds to a slot; preferably, there is one virtual IP address per edge region per slot. It is sometimes referred to as a VIP.
- path 315—an ordered set of CDN regions between an edge region and a gateway region.
- path Segment 317—a single hop of a path.
- tunnel 319—a set of one or more paths from an edge server to a gateway server.
- session 321—A single end-to-end connection from the client 322 to the target server; preferably, the session is defined by a five tuple (IP payload protocol, source address, destination address, source port, destination port). The source is the client and the destination is the target.

Figure 4:
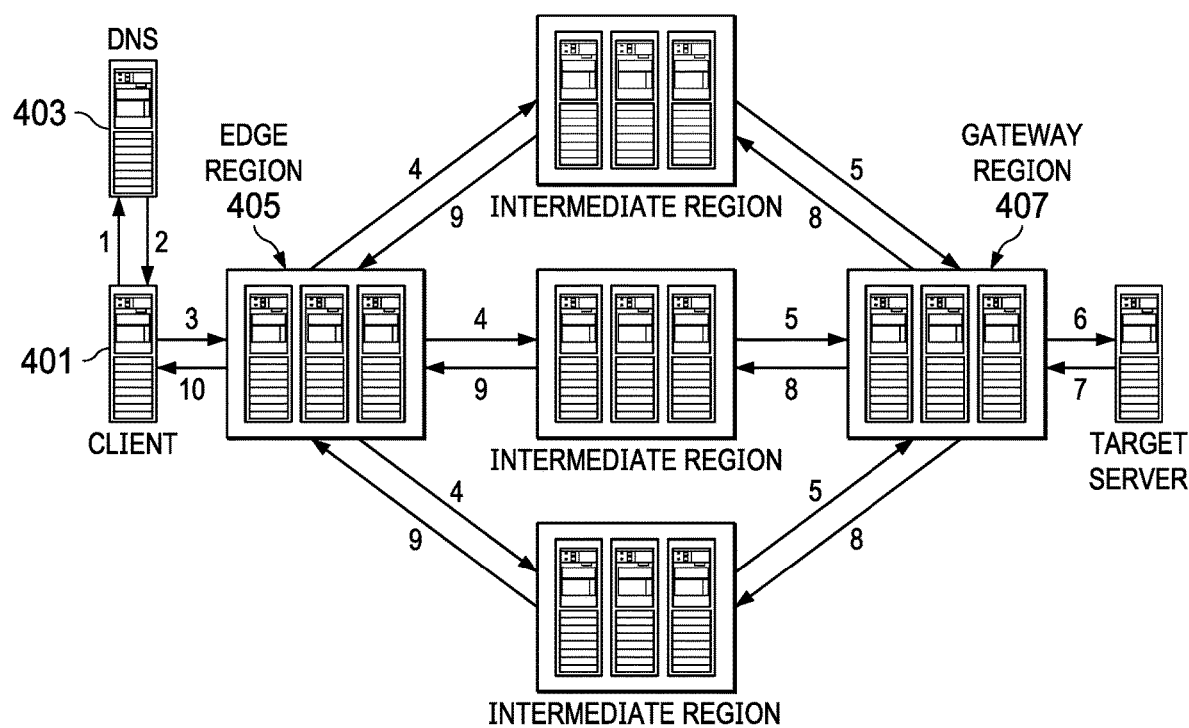
FIG. 4 illustrates a multi-path overlay IP (OIP) routing mechanism implemented within a content delivery network, such as shown in FIG. 1.

In one known use scenario of the overlay network, one or more clients desire to send packets to a single IP address. This is illustrated in FIG. 4 and is now described. At step 1, the client 401 makes a DNS request to resolve a hostname, typically a hostname associated with a web-accessible application. This hostname is aliased (e.g., by a CNAME) to a domain that is being managed by an authoritative DNS 403; typically, the authoritative DNS is managed by the CDN service provider. Preferably, this hostname corresponds to a single gateway region (and target address). This is also referred to as a slot, as described above. At step 2, the DNS query returns a single IP address for the hostname. This address identifies a best performing available edge region 405 and, preferably, that region is dedicated to the hostname. The address is referred to as a virtual IP address, as described above. At step 3, the client 401 begins to send IP packets to the virtual IP address. These packets are received by a server in the edge region 405. The edge region 405 knows the gateway region 407 to which to send the packets based on the destination address in the IP packet header. The packet is then encapsulated. At step 4, and based on routes preferably provided by a CDN mapping system, the edge server in the edge region 407 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 407, once again, preferably based on routes provided from the CDN mapping system. At step 6, the packets are received by a server in the gateway region 407, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 405 from which the client packet originated. At step 7, the gateway region 407 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

Unified Browser-Based Enterprise Collaboration Platform Using an Overlay Network As will be described in more detail below, this disclosure provides a technique for multicast delivery of real-time video. In one non-limiting embodiment, the technique provides for multi-party videoconferences in which the live streams (typically video, but also including audio) are delivered via an overlay network such as described above. To this end, participants (end users) use client computing machines (e.g., desktops, laptops, mobile devices such as tablets, smart phones, and so forth). A representative client computing machine comprises hardware, memory, a data store, and software such as an operating system, applications and utilities. The client machine also includes a web browser or mobile application (app) that provides a markup language-based rendering engine. In a typical use case, the browser (or software associated therewith) is assumed to have the capability of displaying a video of a participant (or the videos of multiple individual participants) that are participating in a conference.

As will be seen, the approach herein leverages a unified browser-based enterprise collaboration platform that preferably uses the services of the overlay network (either natively, as a network-accessible managed service, or the like). The client computing machines are configured to communicate via protocols such as WebRTC. The following assumes familiarity with WebRTC.

As will be seen, using an overlay network fabric according to this disclosure provides significant advantages. In particular, by distributing multiplexing and the relay infrastructure over a platform, such as a CDN (as described above), a solution that facilitates multi-user collaboration, such as video conferencing, chat, document sharing, and desktop sharing, is provided. While a primary use case as described below is for high-quality video conferencing that is scalable to large numbers of users, this is not a limitation, as the cloud-supported multiplexing and relay techniques herein may be used to provide other multi-user collaboration, such as chat, document sharing, and desktop sharing, all in a seamless and scalable manner. The overlay network can also provide additional functions and features to support a collaboration session; these may include, without limitation, persistent storage and recording of sessions and documents, integration with existing videoconferencing and telecommunications infrastructure (LifeSize rooms, PSTN, etc.), and others.

Figure 5:
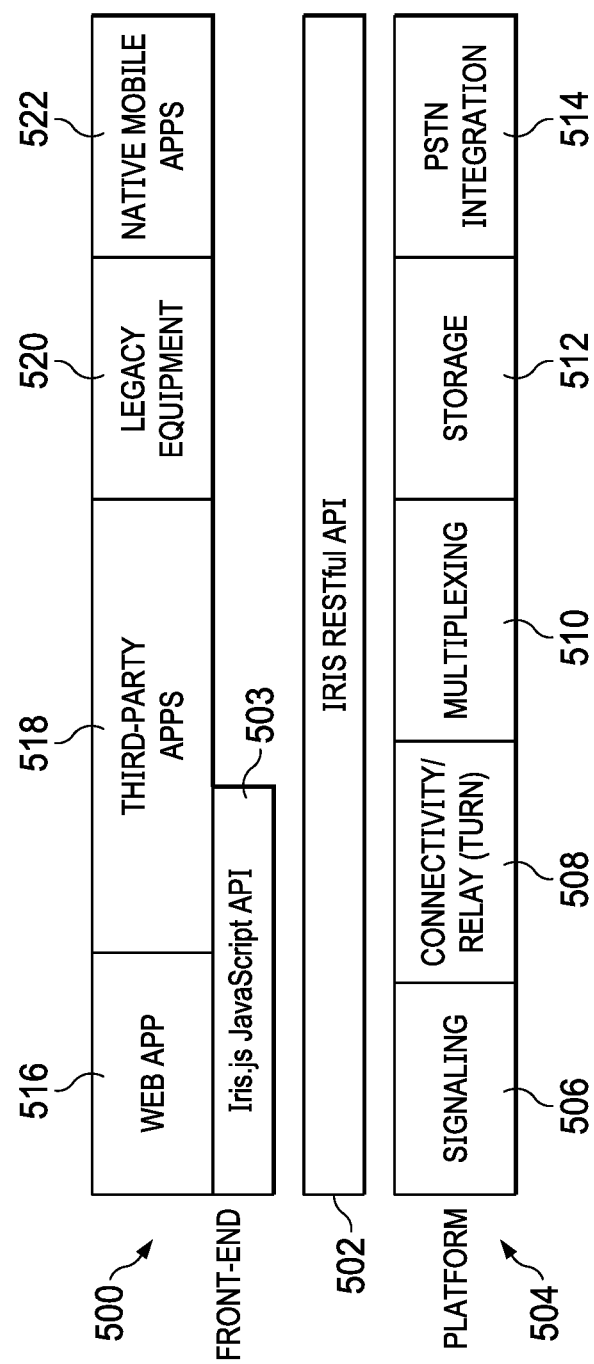
FIG. 5 depicts the various components of a web-based collaboration solution according to this disclosure.

FIG. 5 depicts a representative architecture 500 for an enterprise collaboration platform using an overlay network according to an aspect of this disclosure. Preferably, there are three primary elements: a front-end application 500, RESTful APIs 502, and a back-end or platform 504. The front-end application (app) 500 preferably is built on a number of components (described below) that are preferably accessed through the one or more RESTful APIs 502. As will be seen, this architecture allows on-premises infrastructure to be integrated with the solution, and it could also be used to allow third parties to create applications powered by the platform. The platform components 504 include signaling 506, connectivity 508, multiplexing 510, storage 512, and PSTN integration 514. In one embodiment, the platform 504 comprises part of an overlay network (or leverages elements thereof), but this is not a requirement, as the solution herein may be provided as a standalone architecture. Further, the notion of a "component" herein may involve multiple machines, whether co-located or distributed, as well as the processes and programs executing thereon.

Turning first to the platform, the signaling component 506 preferably is a distributed signaling system that keeps track of users' state (e.g., "Online", "Away", "Busy", etc.), and it is used to transmit the information (i.e., SDP) necessary to initiate an RTCPeerConnection (when WebRTC is used as the transport protocol). The signaling component 306 preferably integrates with various user authentication and identity management solutions, although this is not a requirement. The connectivity component 508 manages video, voice and data connections routed though the overlay network platform to handle Network Access Translation (NAT) traversal, as well as to provide enhanced performance and security.

The multiplexing component 510 comprises multiplexing machines to allow for scalable, multi-peer sessions. This component makes it so that each peer only needs to upload its media stream once. Other peers are then able to access peers' media streams through overlay network edge machines (rather than by direct connections to peers). The multiplexing component provides for multiplexing in the cloud to significantly reduce edge bandwidth requirements that would otherwise be required to support WebRTC (which otherwise dictates a new connection be setup for pair of peers in a multi-user collaboration). With this approach herein of using the overlay network in this manner, there is no requirement to setup a new connection for each pair of peers in a multi-peer collaboration (conference, chat, etc.) session.

As will be described, and as a further feature, preferably the multiplexing component 510 intelligently adjusts the quality of different users' streams to enhance performance—e.g., only deliver HD streams for people who are currently speaking, deliver lower-quality streams to mobile devices, etc.

The storage component 512 allows overlay network customers to (optionally) store data from a collaboration session (e.g., record a meeting, save work on a collaborative document, etc.). The PTSN integration component 514 allows users to join sessions from the PSTN and legacy telecommunications equipment, and it allows users to call out over the PSTN. Although not depicted, the platform may include a transcoding component that allows for communications between browsers that do not have the same video codecs implemented, and for one-way broadcasting to browsers that do not support WebRTC.

As noted, the front-end components 500 interact with the back-end platform 504 using an application programming interface, such as RESTful APIs 502. These APIs 502 provide methods for exchanging SDPs to set up calls, provide information on which chat rooms are available, which media streams are available in each chat room, which user media streams in a given chat room are most "relevant" at any given moment, and so forth. The APIs preferably also provide methods for interacting with other parts of the back-end, e.g., verifying users' identities, accessing storage (saving data, retrieving data, searching), and the like. As also depicted, the APIs also preferably include a JavaScript (JS) API 503, referred to herein as "iris.js," which is a thin layer on top of the base WebRTC API and other HTML5 components. The iris.js API 503 preferably uses the other RESTful APIs to integrate with the overlay network fabric. In particular, the iris.js API allows applications to establish and use video, voice, and data channels. Preferably, the front-end web app is built on the JavaScript API, and third party applications may use this API to build apps that seamlessly integrate with the platform.

The front-end components 500 comprise a web application (or web app) 516, which is a unified communication tool built on iris.js. The web app 516 routes video, voice, and data through the overlay network fabric. The web app also provides (or interfaces to) one or more collaboration functions or technologies, such as video chat, collaborative document editing, desktop sharing, and the like. Because the web app 516 preferably is built in an API (such as iris.js 503, which can support several data channels), it is easily extensible. Thus, users are able to choose which voice, video, and data channels to connect to for a given session—for example, several users in a video conference room could use the room's camera and mic for videoconferencing with a remote site, but each individual user might use his or her personal laptop to edit a shared document. Preferably, the web app 516 is skinnable so it can be rebranded and used by enterprise customers. As noted, because iris.js is built on top of the WebRTC API's, third parties are able to easily adapt existing WebRTC applications to use the solution described herein. The third party applications 518 are depicted here as part of the front-end, but they may be separate and distinct. As noted above, the RESTful API 502 also makes integration with other collaboration tools possible. As also depicted, the front end may include or have associated therewith legacy on-premises equipment 520, such as LifeSize rooms. Further, the front-end may include or have associated therewith native mobile apps 522, such as devices and tablets that run native iOS and Android apps (as opposed to HTML5 apps in mobile browsers, which are also supported). The API layer 502 enables a service provider or third parties to easily build native mobile applications for the solution.

Figure 6:
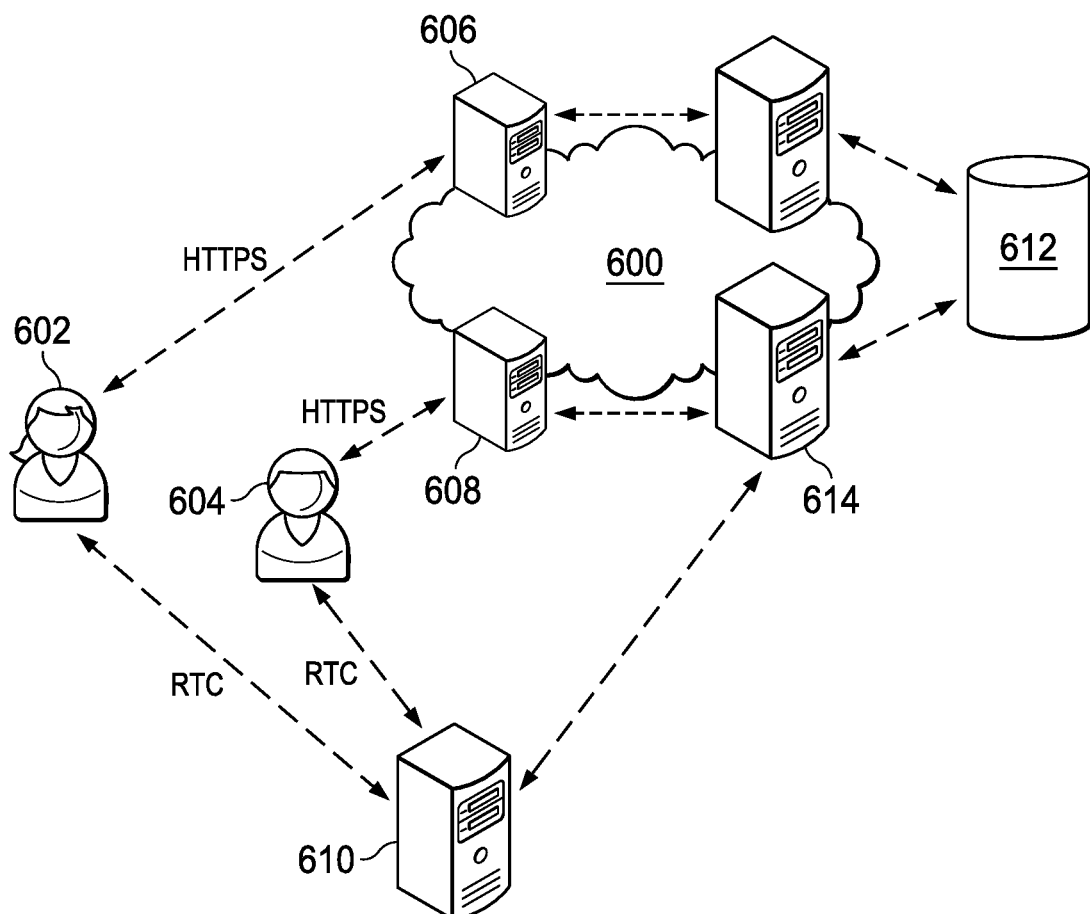
FIG. 6 illustrates a multi-party videoconference setup that is enabled by associating the web-based solution of this disclosure with an overlay network.

In one embodiment, the above-described solution provides a multi-party voice and video chat system. FIG. 6 depicts further implementation details of a multi-party solution implemented within an overlay network 600, such as a Content Delivery Network (CDN) provided by Akamai Technologies, Inc. of Cambridge, Mass. This commercial solution is not a limitation of this disclosure.

As depicted, there are two end user peers 602 and 604, and each peer is associated (e.g., using conventional CDN DNS mapping operations) to respective edge servers 606 and 608. Each peer also establishes a WebRTC connection to a media server 610 that hosts the videoconference (in this example scenario). A signaling back-end is powered by a distributed data store 612. In an example implementation, the platform is implemented using a combination of Node.js, PHP, Apache, Cassandra, and Kurento Media server running on Ubuntu Linux machines. Cassandra data is accessed via the RESTful API, which is powered by Node.js running behind an Apache proxy 614. In this approach, signaling information is exchanged via HTTPS interactions using the RESTful API. Multiplexing is accomplished using the Kurento Media Server running on cloud Ubuntu VMs running in geographically-distributed locations. In operation, the Node.js signaling application performs a DNS lookup to the CDN mapping to determine an optimal (in terms of one or more factors such as latency, loss, load, availability, reachability, etc.) media server to which as client should connect. Clients upload their live media stream via WebRTC to the chosen media server. The connection is set up by the signaling layer through the RESTful API. Other clients who wish to subscribe to that media stream connect to the same media server (via the signaling layer) and receive the stream.

While the approach shown in FIG. 6 is typical, it is not a limitation. In an alternative embodiment, the underlying network environment may allow for direct connectivity between peers. This requirement is met among users, for example, as long as peers are connected to an enterprise VPN. Another approach is to use STUN and TURN servers that run, for example, on cloud virtual machine (VM) infrastructure. In still another embodiment, a TURN-compliant version of a relay network for peer-to-peer connectivity may be used. In the multi-party case described above, STUN and TURN are not needed because it is assumed that clients can connect directly to multiplexing servers. Still another approach to connectivity may involve a multicast overlay network to distribute streams.

In this example implementation, the API is powered by a Node.js web application. The Node.js application interacts with Kurento Media Server and Cassandra to orchestrate calls. The "iris.js" JavaScript API is a client-side ECMAScript 6 library that allows web applications to interact with the system via the Iris RESTful API. It contains functionality that allows for easy WebRTC connection management, call orchestration, and automatic, dynamic quality switching, e.g., as the relevancy of different participants in a room changes. The web application is an HTML5 Web App written on top of iris.js. The views are powered by a PHP application.

Multicast Overlay Network for Delivery of Real-Time Video

As noted, this disclosure provides for multicasting real-time video to multiple subscribers using an overlay network on top of the Internet. The technique assumes that the overlay network provides a network of machines capable of ingress, forwarding, and broadcasting traffic, together with a mapping infrastructure that keeps track of the load, connectivity, location, etc., of each machine and can hand this information back to clients using DNS or HTTPS. An approach of this type is described in U.S. Pat. Nos. 6,665, 726 and 6,751,673, assigned to Akamai Technologies, Inc., the disclosures of which are incorporated herein. The technique described there provides for an application layer-over-IP routing solution (or "OIP routing"). As will be described, the approach herein implements multicast OIP to distribute individuals' video streams in a multiparty videoconference. Multicast OIP could may also be used as a generic real-time publish-subscribe overlay network or for broadcast of video in real-time.

In this approach, a publisher (which may be just an individual user) sends data to the multicast network. Clients (e.g., end user peers running mobile devices, laptops, etc.) subscribe to this data stream. The overlay network handles intelligently routing and fanning-out the data stream to all subscribers. The forwarding network may use multiple paths, forward error correction, and the like to ensure the reliability and performance of the stream. Preferably, the intermediate communications are encrypted.

The publisher and subscriber operations are now further described. To initiate the session, a publisher makes a DNS (or HTTPS) request to a load balancer operated by the overlay network service provider (e.g., Akamai global traffic manager service). The request preferably contains a unique identifier for the publisher's data stream. The load balancer finds an ingress node on the network that has available bandwidth, CPU, and other resources, and that will have good connectivity to the publisher (close by from a network perspective), and hands back an IP address (or URI) corresponding to that node. This is a known OIP operation. The publisher connects to the ingress node. Then, the publisher sends its data (e.g., a video stream generated by a webcam) to the ingress node. The overlay network handles distributing the video stream to subscribers. To obtain the stream, subscribers make a DNS (or HTTPS) request to mapping (overlay network DNS). This request contains the unique identifier of the data stream which the subscriber wants to consume. The mapping system finds an egress node that can deliver the stream to the subscriber, and hands back an IP address (or URI) for that egress node. If necessary, the system builds a fan-out tree by assigning forwarding nodes between the ingress and egress nodes. The system forwards data through the forwarding nodes to the egress nodes. The subscriber then connects to the IP/URI it got in the first step, and consumes the data stream.

The following are use cases for the above-described approach.

A first use case is WebRTC. In the WebRTC case, the ingress and egress nodes need to handle WebRTC PeerConnections. Subscribers to a given stream have individual WebRTC PeerConnections to individual egress nodes; the overlay system takes care of distributing the stream from the ingress nodes to the individual egress nodes.

A second use case is arbitrary TCP (or UDP) traffic. In this case, each subscriber maintains a TCP connection (or UDP session) with its respective egress node. The data sent in each of these connections is the same data, duplicated and forwarded from the publisher.

A third use case is "simulated" Internet-wide multicast. In this case, each egress node lives in the same network as subscribers, and that network must support multicast. Subscribers within that network get data from the egress node via conventional multicast. The overlay network distributes the data across the Internet to egress nodes in individual networks; thus Internet-wide multicast is simulated using the overlay network.

Another use case is "simulated" multicast using anycast. This case is similar to the arbitrary TCP/UDP traffic case, but the same (anycasted) IP address is handed back to any client that subscribes to a particular stream. Each egress node for that stream advertises the anycast address for that stream. This works for UDP, and If the advertisements are handled appropriately, it works for TCP as well.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including collaboration technologies including videoconferencing, chat, document sharing and the like, distributed networking, Internet-based overlays, WAN-based networking, efficient utilization of Internet links, and the like, all as described above.

What is claimed is:

1. A method of multicasting over a multicast network of machines providing ingress and broadcast, the multicast network associated with an overlay network, the method comprising:

receiving a data stream at an ingress node of the multicast network, the ingress node having been identified as having sufficient bandwidth and processing capability, and by being in network proximity to a publisher of the data stream;

responsive to resolution of name requests associated with the data stream, associating a set of client machines to the data stream by identifying, for each client machine, an appropriate egress node of the multicast network, at least one egress node being distinct from the ingress node; and delivering the data steam to a respective client machine of the set of client machines from its identified egress node;

wherein the set of client machines participate in a collaboration session with respect to the data stream.

2. The method as described in claim 1 wherein the data stream is a video stream.

3. The method as described in claim 2 wherein the video stream is received at the ingress node using Web Real Time Communications (WebRTC) protocol.

4. The method as described in claim 3 wherein the respective client machine consumes the video stream via WebRTC.

5. The method as described in claim 1 wherein the collaboration session has an associated chat session.

6. The method as described in claim 1 wherein the collaboration session has an associated document share.

7. The method as described in claim 1 wherein the collaboration session has an associated desktop share.

8. The method as described in claim 1 wherein the collaboration session is a video conference among users of the set of client machines.

9. The method as described in claim 3 wherein the ingress and egress nodes handle WebRTC PeerConnections, and each client machine has an individual WebRTC PeerConnection to an individual egress node.

10. The method as described in claim 1 wherein the multicast network is part of the overlay network.

11. The method as described in claim 10 wherein the overlay network is a content delivery network (CDN).

12. The method as described in claim 1 wherein each client machine maintains a Transmission Control Protocol (TCP) connection or Unigram Data Protocol (UDP) session with its respective egress node.

13. The method as described in claim 1 wherein an egress node is located in a same network as a network used by the client machine, and wherein the network supports multicast.

14. The method as described in claim 1 wherein an anycast Internet Protocol (IP) address is provided to any client machine that subscribes to consume the data stream.

15. The method as described in claim 1 further including building a fan-out tree of nodes between the ingress node and the identified egress nodes, and forwarding the data stream within the multicast network over the fan-out tree.

* * * * *